United States Patent [19]
Wikman

[11] 3,856,844
[45] Dec. 24, 1974

[54] CHEMICAL PROCESS

[75] Inventor: Andrew O. Wikman, Baton Rouge, La.

[73] Assignee: Ethyl Corporation, Richmond, Va.

[22] Filed: Dec. 11, 1970

[21] Appl. No.: 97,373

[52] U.S. Cl. .......................................... 260/465.5 A
[51] Int. Cl. ......................................... C07c 121/42
[58] Field of Search ............................ 260/465.5 A

[56] References Cited
UNITED STATES PATENTS

| | | | |
|---|---|---|---|
| 2,855,428 | 10/1958 | Singer et al. | 260/465.5 |
| 3,337,607 | 8/1967 | Wollensak | 260/465.5 |
| 3,424,783 | 1/1969 | Harper et al. | 260/465.5 |
| 3,463,805 | 8/1969 | Morgan et al. | 260/465.5 |
| 3,504,011 | 3/1970 | Gandhi | 260/465.5 |
| 3,515,742 | 6/1970 | Morgan et al. | 260/465.5 |
| 3,637,799 | 1/1972 | Herz | 260/465.5 A |
| 3,679,728 | 7/1972 | Morgan et al. | 260/465.5 A |
| 3,679,729 | 7/1972 | Daniels | 260/465.5 A |

FOREIGN PATENTS OR APPLICATIONS

| | | | |
|---|---|---|---|
| 1,163,684 | 9/1969 | Great Britain | 260/465.5 |
| 1,115,980 | 6/1968 | Great Britain | 260/465.5 |

*Primary Examiner*—Joseph P. Brust
*Attorney, Agent, or Firm*—Donald L. Johnson; John F. Sieberth; Shelton B. McAnelly

[57] ABSTRACT

It is disclosed that nitrilotriacetonitrile can be produced in improved yield and purity at a rapid rate from reactants based on ammonia, a mineral acid, formaldehyde and hydrogen cyanide wherein the reactants individually or in pre-formed combinations are brought together in a brief contact first zone, then cooled, then fed to a second zone for continued reaction. The intervening cooling step provides a reduced temperature feed to the second zone providing cooling of the second zone without requiring heat exchanger type of cooling thereof. The intervening cooling can utilize heat exchanger type cooling because the solution at that point has not yet reached a highly supersaturated condition.

11 Claims, No Drawings

CHEMICAL PROCESS

BACKGROUND OF THE INVENTION

1. Field of the Invention

The invention relates to the manufacture of amine nitriles and in particular to the manufacture of nitrilotriacetonitrile. Nitrilotriacetonitrile is useful as a synthesis intermediate. On reaction with caustic such as NaOH or KOH, corresponding metal salts of nitrilotriacetic acid are produced having valuable properties as cleaning agents.

2. Description of the Prior Art

The general preparation of amine nitriles such as nitrilotriacetonitrile from reactants involving formaldehyde, ammonia and hydrogen cyanide has been well known in the art for many years. U.S. Pat. Nos. 2,855,428 and 3,061,628 are typical of such processes. In these processes the rate limiting reactant, typically ammonia or hexamethylene tetraamine, is added last and at a slow rate seeking virtually complete instantaneous reaction thereof as fed to the final product. Cooling is required to maintain the specified temperature conditions for the reaction. Additional prior art in this general area is U.S. Pat. No. 3,515,742 which discusses performing the reaction in what is termed adiabatic operation. The precise reason for such "adiabatic" operation is not made clear; however, it is noteworthy from what discussion is present in the patent that a considerable amount of internal heat exchange is involved within the so-called adiabatic operation, the incoming reactants being used in heat transfer contact with reaction product to warm one and cool the other. In such prior art process, emphasis is placed upon a so-called absence of external cooling as a result of which temperatures up to about 200°C are attained. Such temperatures are quite high for the materials involved; however, and the internal heat exchange required to maintain the overall adiabatic operation certainly does not avoid heat exchangers and their problems.

A preferred process for producing amine nitriles is that of U.S. Pat. No. 3,337,607. This process involves a specific order of addition of reactants providing enhanced ability to achieve control over proportions and conditions leading to high reaction rates to produce a more uniform product in high yield. In this process it is desired to avoid temperatures of the order of 200°C since these temperatures are frequently accompanied by tendencies toward undesired side reactions which provide product contamination and lowered yields and involve serious problems of materials of construction of equipment used in the process.

DISCUSSION

The production of nitrilotriacetonitrile (NTN) is known to be critically dependent upon conditions that affect reaction rate, yield and purity of product. By attention to conditions, viz., identity, proportions and order of combination of reactants and by avoiding certain conditions that produce undesired side reactions, the desired product can be obtained readily and in good yield and purity. In general, the reactions involved are performed in aqueous systems at temperatures preferably of the order of 100°–200°F and the product is recovered by crystallization from a highly acidic supersaturated solution.

The various routes and combinations of reactants are characterized by the liberation of vast quantities of heat. The removal of this heat of reaction is a serious problem from a heat exchanger materials of construction viewpoint and it is magnified by the inherent fouling and pluggage tendencies connected with attempting to cool supersaturated solutions.

Although it is possible to feed all reactants individually and separately either intermittently or continuously to a reaction zone if one has positive and fail-safe capability of instantaneous measurement and control of flows, conditions and compositions, the difficulties associated with such have generally required the combination of various reactants in some progressive order or sequence. Thus in U.S. Pat. Nos. 2,855,428 and 3,061,628, ammonia is added last whereas in U.S. Pat. No. 3,337,607, hydrogen cyanide is provided last. Such sequential addition can have other benefits; for example, when the mineral acid is supplied to the reaction system as an ammonia salt of the acid, rather than as separate ammonia and acid, the problem of control of pH is vastly simplified. Feeding the ammonium salt also has a significant heat removal benefit because when such is performed, the heat can be removed in a preliminary stage before there is any NTN crystallization problem to complicate the cooling.

An additional heat removal benefit is obtained when the formaldehyde is combined with the ammonium salt in a second preliminary reaction when the ammonium salt carries all the acid equivalent that is required. The heat of reaction at this point is readily removed without cooling complications produced by NTN crystallization. In this step all the ammonia may be fed as the ammonium salt or part of it may be supplied as anhydrous ammonia or as ammonium hydroxide. In either event, it is desired to avoid the feed of free acid at this point.

With such two preliminary reaction steps, much of the overall heat of reaction (typically one fourth of the total) is removed before the hydrogen cyanide is combined, thus before there is the possibility of heat removal complication due to NTN crystallization.

When the hydrogen cyanide is finally provided in the final phase, substantially all of it appears to react almost instantly, producing moderately soluble intermediates which do not cause crystallization problems immediately. When this step is allowed to continue for only a brief time, say from a few seconds up to about 10 minutes contact time at about 150°F, somewhat longer at lower temperatures, about half of the heat of reaction remaining to be liberated after the preliminary steps is liberated at this stage and is readily removed by a heat exchanger with comparatively minor fouling problems.

After longer contact times, however, such as 15 or 30 minutes at 175°F, somewhat longer at lower temperatures, the intermediates produced during the brief contact step appear to rearrange into NTN in substantial amount producing a saturated and then a supersaturated solution. Further heat exchanger type cooling is difficult after this point has been reached.

The present invention is based on the discovery that the final reaction phase is advantageously divided into two parts with heat removal cooling in the first brief part and in an intervening temperature reduction or quench operation, the required cooling for the second part of the final phase being provided principally by the "sensible heat capacity" of the cooled feed thereto without requiring heat exchanger cooling thereof. Typically, in this arrangement, neglecting heat losses from piping and reactors, about one fourth of the overall heat of reaction is removed in the preliminary reactions before HCN is fed, about one fourth is removed in the initial contact of the final phase, about one fourth is removed in the intervening cooling operation before the second part of the final phase and the balance is removed as sensible heat of the effluent from the second part of the final phase.

In general, the fundamental principles of a two step operation with intervening temperature reduction provides a contacting process that is advantageously used with various sequences of combination of the reactants, using various preformed combinations of the reactants. On the other hand, the foregoing sequence of two preliminary steps for performing the reactants with hydrogen cyanide made available last is a particularly preferred process sequence.

SUMMARY OF THE INVENTION

The present invention relates to a process for producing amine nitriles such as nitrilotriacetonitrile from amines such as ammonia, formaldehyde, and hydrogen cyanide in the presence of a strong mineral acid. In particular, the invention relates to an improvement in such processes wherein the necessary reactants are combined in a first reaction zone liberating a substantial amount of heat of reaction which is readily removed by a heat transfer type of cooling. Following the initial contacting the material is reduced in temperature, again in a heat transfer type of cooling, following which the material is delivered to a second reaction zone to react to completion to the desired product without requiring additional heat transfer type of cooling. In general, the interstage temperature reduction is desirably adequate to provide a significant amount of sensible heat capacity when the material is heated by the mass within the second reaction zone to thereby absorb the heat liberated in the second zone. In general, this usually means a temperature reduction of at least 10°F in the interstage cooling, with reductions of up to 50°F or more preferred.

In the present process at least one of the reactants is combined with the other reactants in a first reaction zone and the system is at least partially reacted therein at a pH at least as acidic as about 2.0 at a temperature from about 120° to about 250°F. The reaction to amine nitrile such as nitrilotriacetonitrile in this first zone is less than complete. Typically, the extent of reaction at this point is such that about one fourth of the total heat liberated in the reaction is liberated at this point within a brief period of up to about 10 minutes contact time. This one-quarter fraction of the total is equal to about one half of the heat of reaction to NTN of hydrogen cyanide with a preformed system of ammonia, acid and formaldehyde.

The effluent from the first reaction zone is then reduced in temperature by at least about 10°F so that the resultant temperature of the effluent is within the range of from about 50° to about 150°F. Then the cooled effluent is allowed to react substantially completely to nitrilotriacetonitrile at a temperature from about 150°F to about 250°F, the sensible heat capacity of the reduced temperature effluent in being heated to the temperature of the second stage of the reaction being utilized to absorb at least a part of the heat liberated by the reaction in the second stage.

In a preferred aspect of the present process, the reaction is conducted in the presence of a strong mineral acid environment, typically sulfuric acid fed to the system with at least part of the ammonia in the form of ammonium sulfate. Other suitable acids and derivatives include HCl, HF and $H_2SiF_6$.

In a preferred aspect of the present process, the strong mineral acid is sulfuric acid which is fed with at least part of the ammonia in the form of ammonium sulfate and this is prereacted with formaldehyde, the hydrogen cyanide being combined with the ammonium sulfate-formaldehyde system in the first reaction zone.

The present invention is useful to produce other amine nitriles by substituting other amine compounds for the ammonia. Thus, ethylene diamine tetraacetonitrile is produced from ethylene diamine with the proper adjustment of stoichiometry.

In a preferred aspect of the present invention, from about one-fourth to about three-fourths of the heat of reaction of the ammonia, acid and formaldehyde system with hydrogen cyanide is liberated in the first reaction zone.

In a more preferred aspect of the present invention, about half of the heat of reaction of the ammonia, acid and formaldehyde system with hydrogen cyanide is liberated in the first reaction zone.

A preferred aspect of the present invention is that the maximum temperature reached in the second zone is controlled at least in part by adjusting the amount of temperature reduction occurring in the interstage between the two reaction steps.

In a preferred aspect of the present invention the temperature of the first reaction zone is from about 130° to about 170°F.

In a preferred aspect of the present invention the temperature of the second reaction zone is from about 170° to about 190°F.

The present invention relates to a process for producing nitrilotriacetonitrile (NTN) in which there is formed at a temperature from about 50° to about 120°F an aqueous system of ammonium ion $(NH_4)^+$, sulfate ion $(SO_4)^{--}$, and formaldehyde $(CH_2O)$ wherein the mol ratio of $(CH_2O)$ to $(NH_4)^+$ is from about 2.9:1 to about 3.1:1, and the mol ratio $(SO_4)^{--}$ to $(NH_4)^+$ is from about 0.175 to about 0.5. The system thus formed is reacted with hydrogen cyanide (HCN) wherein the mol ratio of (HCN) to ammonium ion $(NH_4)^+$ is from 2.9:1 to about 3.1:1, said reacting being for a contact period of from about 1 second to about 1 hour and at a temperature from about 120° to about 175°F during which period substantially complete reaction of HCN occurs and from about one-fourth to about three-fourths of the total heat of reaction of the system with hydrogen cyanide to produce nitrilotriacetonitrile is liberated.

Following the first reacting with hydrogen cyanide, the temperature of the effluent from the first step is reduced by a significant amount of at least about 10°F to a temperature from about 50° to about 150°F.

Substantially complete reaction of the temperature reduced effluent to product nitrilotriacetonitrile is obtained in a second phase reaction which is conducted for a period of time from about ten minutes to about 6 hours during which the temperature of the cooled effluent rises at least 10°F but does not exceed a selected maximum temperature of from about 150° to about 250°F. The cooling of the second phase reaction to maintain the desired temperature maximum is obtained without requiring heat transfer type of operation by utilizing the sensible heat required to raise the reduced temperature feed for the second reaction phase to the desired reaction temperature.

In one aspect of the present invention, additional cooling is provided by recycling the mother liquor obtained after NTN is separated to provide additional sensible heat absorption capability of the system in the second phase reaction.

The following examples indicate preferred embodiments of the present invention.

EXAMPLE I

To a first continuous mixer maintained at 131°F by a heat exchanger (water cooled) was added (1) 46.0 pounds per hour of formaldehyde (50.0 wt. percent $CH_2O$, 2.3 percent $CH_3OH$, 47.7 percent $H_2O$), (2) 8.4 pounds per hour of ammonium hydroxide solution containing 25 wt. percent $NH_4OH$, and (3) 8.4 pounds per hour of $(NH_4)_2SO_4$ in 14.7 lbs per hour of water. The average residence time in the mixer was 25 minutes. The "mol" ratio of $SO_4^{--}$ to $(NH_4)^+$ was 0.094/0.278 = 0.338. The mol ratio of water to $(NH_4)^+$ was 12.9. The temperature of the reactants fed was 90°F. The heat of reaction at this stage was 4,250 B.T.U. per hour as measured from the sensible heat of the feed in changing from 90° to 131°F, the system heat losses (as measured with water circulating) and the heat removed by the heat exchanger water $\Delta T$.

The effluent from the first mixer was fed to a second continuous mixer maintained at 150°F by a heat exchanger (water cooled) and combined with 20 pounds per hour total of >99.5 wt. percent HCN fed at a temperature of about 90°F. The average residence time was 7 minutes in this stage.

The heat of reaction at the second stage was 5,660 B.T.U. per hour measured from the sensible heat of the feed in changing from 131° to 150°F, the system heat losses (as measured with water circulating) and the heat removed by the heat exchanger water.

Effluent from the second stage was delivered to a heat exchanger (water cooled) wherein it was cooled to 110°F. Residence time in the cooler was less than 1 minute. The heat removed was 3,158 B.T.U. per hour which was the sum of system losses and heat removed by the heat exchanger water.

Cooled effluent from the second mixer was fed to the first of a series of three continuous flow hold tanks with an average residence time of 23 minutes in each tank. The first tank was at 190°F, the second at 203°F and the third at 205°F. The three tanks were not cooled except by losses and the sensible heat of the feed to each. The heat of reaction in the first hold tank was 6,850 B.T.U. per hour, in second 1,640 B.T.U. per hour and in the third, about 400 B.T.U. per hour which was neglected in calculating. Actually the heat losses at this vessel were larger than that generated usually necessitating independent heating to maintain the set temperature.

The total heat from the above which is the sum of the reaction heats of the first and second mixers and the first and second hold tanks is 18,400 B.T.U. per hour. The feed rate was equivalent to 0.246 mols of NTN product per hour. Thus the heat load per pound-mol of NTN product is about 74,400 B.T.U. In this calculation the 21,000 B.T.U. per pound mol heat of crystallization of NTN did not need to be considered because of the high temperature of the second and third hold tanks.

The first mixer of this example is also called the second premixer in preceding discussion of the specification since it combines the $(NH_4)_2SO_4$ and the $CH_2O$. It is part of the "forming" step reacted in the claims. The second mixer of this example receives the final reactant, the HCN, and hence is the first reaction zone or the first reacting step of the claims.

Effluent from the third tank was cooled to 110°F and centrifuged to recover the crystals of NTN.

The yield was 90 to 92 percent NTN based on the reactants fed.

EXAMPLE II

Example I was repeated under the following conditions.

| | |
|---|---|
| Temperature of first mixer | 141°F |
| Heat of reaction in first mixer | 3,690 B.T.U./hr. |
| Residence time in first mixer | 25 minutes |
| Temperature of second mixer | 150°F |
| Heat of reaction in second mixer | 7,420 B.T.U./hr. |
| Residence time in second mixer | 7 minutes |
| Cooler effluent | 125°F |
| Heat removed in cooler | 1,974 B.T.U./hr. |
| Residence time in cooler | less than 1 minute |
| Temperature of first hold tank | 175°F |
| Heat of reaction in first hold tank | 4,510 B.T.U./hr. |
| Residence time in first hold tank | 23 minutes |
| Temperature of second hold tank | 204°F |
| Heat of reaction in second hold tank | 2,890 B.T.U./hr. |
| Residence time in second hold tank | 23 minutes |
| Temperature of third hold tank | 205°F |
| Residence time in third hold tank | 23 minutes |

Product was recovered as in Example I for similar yield.

EXAMPLE III

A portion of the 110°F filtrate from Example I was recycled to the second hold tank to maintain a temperature of 175°F in the second hold tank. The third hold tank temperature was about 180°F; however, for the most part this third hold tank was heated to operate at about 205°F to avoid heat of crystallization computations. It is desirable to avoid exceeding about 175°F because of the severe corrosion problems experienced at such higher temperatures.

I claim:

1. In a process for producing nitrilotriacetonitrile from ammonia, formaldehyde, hydrogen cyanide, and a strong mineral acid, the improvement wherein:
   A. at least one of said reactants is combined with the other reactants and at least partially reacted therewith in an aqueous system in a first reaction zone at a pH at least as acidic as about 2.0 at a temperature from about 120° to about 250°F, wherein the reaction to nitrilotriacetonitrile is less than complete, producing an effluent,
   B. the effluent from said first reaction zone is reduced in temperature by at least about 10°F so that the resultant temperature thereof is within the range from about 50° to about 150°F, and
   C. the cooled effluent is reacted substantially completely at a temperature from about 150° to about 250°F to produce nitrilotriacetonitrile, the heat capacity of the reduced temperature effluent being utilized to absorb at least a part of the heat liberated at this step of the reaction to hold the temperature within the range specified.

2. The improvement of claim 1 wherein the strong mineral acid is sulfuric acid which is fed with at least part of the ammonia in the form of ammonium sulfate.

3. The improvement of claim 1 wherein the strong mineral acid is sulfuric acid which is fed with at least part of the ammonia in the form of ammonium sulfate prereacted with formaldehyde, and wherein the hydrogen cyanide is combined with the ammonium sulfate-formaldehyde system in the first reaction zone.

4. The improvement of claim 3 wherein from about one-fourth to about three-fourths of the heat of reaction of the ammonium sulfate-formaldehyde system with hydrogen cyanide is liberated in the first reaction zone.

5. The improvement of claim 3 wherein about half of the heat of reaction of the ammonium sulfate-formaldehyde system with hydrogen cyanide is liberated in the first reaction zone.

6. The improvement of claim 4 wherein the maximum temperature reached in the second zone is controlled by adjusting the amount of temperature reduction in Step B.

7. The improvement of claim 4 wherein the temperature of the first reaction zone is from about 130° to about 170°F.

8. The improvement of claim 4 wherein the temperature of the second reaction zone is from about 170° to about 190°F.

9. A process for producing nitrilotriacetonitrile (NTN) which comprises:
   A. forming at a temperature from about 50° to about 120°F an aqueous system of ammonium ion $(NH_4)^+$, sulfate ion $(SO_4)^{--}$, and formaldehyde $(CH_2O)$ wherein the mol ratio of $(CH_2O)$ to $(NH_4)^+$ is from about 2.9:1 to about 3.1:1, and the mol ratio $(SO_4)^{--}$ to $(NH_4)^+$ is from about 0.175 to about 0.5,
   B. reacting said system with hydrogen cyanide (HCN) wherein the mol ratio of (HCN) to ammonium ion $(NH_4)^+$ is from about 2.9:1 to about 3.1:1, said reacting being a contact period of from about one second to about one hour at a temperature from about 120° to about 175°F during which period substantially complete reaction of HCN occurs and from about one-fourth to about three-fourths of the total heat of reaction of the system with hydrogen cyanide to nitrilotriacetonitrile is liberated,
   C. reducing the temperature of the effluent from the reacting step at least about 10°F to a temperature from about 50° to about 150°F,
   D. reacting the temperature reduced effluent from C for a period of time from about ten minutes to about 6 hours during which the temperature of the effluent rises at least 10°F and without exceeding a selected temperature of from about 150° to about 250°F, said period of time being of sufficient duration to produce substantially complete reaction to nitrilotriacetonitrile, and wherein
   E. at least part of the heat of reaction liberated at D is absorbed by the heating-up of the temperature reduced effluent from C to the selected temperature of step D.

10. The process of claim 9 wherein solid nitrilotriacetonitrile is recovered from the product of Step D by crystallization and separation of the crystals producing a mother liquor and wherein at least a part of said mother liquor is cooled to a temperature below that of Step D and is recycled to Step D to provide additional capacity for absorbing the heat of reaction liberated at D.

11. In a process for producing nitrilotriacetonitrile from ammonia, formaldehyde, hydrogen cyanide, and a strong mineral acid, the improvement wherein:
   A. at least one of said reactants is combined with the other reactants and at least partially reacted therewith in an aqueous system in a first reaction zone at a pH at least as acidic as about 2.0 at a temperature from about 120° to about 250°F, wherein the reaction to nitrilotriacetonitrile is less than complete, producing an effluent,
   B. the effluent from said first reaction zone is reduced in temperature by at least about 10°F so that the resultant temperature thereof is within the range from about 50° to about 150°F, and
   C. the cooled effluent is reacted substantially completely to produce nitrilotriacetonitrile at a temperature from about 150° to about 250°F, the temperature rise in step C being limited at least in part by the heat required to raise the reduced temperature effluent from step B to the temperature of step C.

* * * * *